Nov. 11, 1952      E. DEVAY      2,617,249
WATCH HOUSING
Filed April 11, 1950
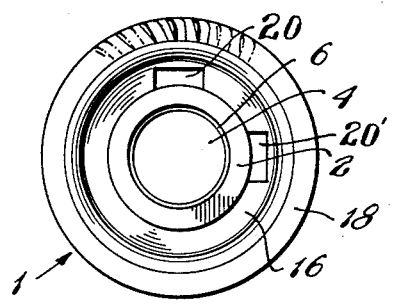
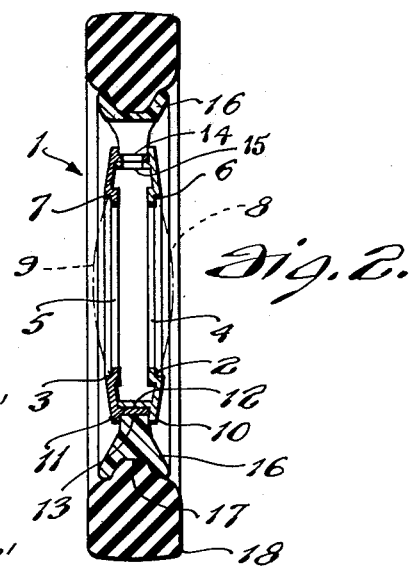
INVENTOR.
EMERIC DEVAY Patented Nov. 11, 1952

2,617,249

UNITED STATES PATENT OFFICE 2,617,249

WATCH HOUSING

Emeric Devay, New York, N. Y.

Application April 11, 1950, Serial No. 155,229

1 Claim. (Cl. 58—88)

The present invention relates to a housing particularly for watches.

It is one object of the present invention to provide a housing for watches which prevents the breaking of the glass or of the watch when accidentally falling down on the floor.

It is another object of the present invention to provide a housing for watches which permits of easy removal of the works and which is surrounded by an exchangeable ring-shaped body preferably of plastic or other suitable material and, thereby, lends itself to providing any predetermined color.

It is still another object of the present invention to provide a housing for watches which in addition to a plastic outer ring may be mounted in a tire of rubber or any other suitable material.

It is yet another object of the present invention to provide a housing for watches which is equipped with a recess in its outer ring which is adapted to receive a chain, ribbon or the like for securing the housing for outside or pocket wear.

It is a further object of the present invention to provide a watch housing, the elements of which may be manufactured by pressing and molding operations, respectively.

With these and other objects in view which will become apparent in the following detailed description the present invention will be clearly understood in connection with the accompanying drawing in which:

Figure 1 is a front elevation of the watch housing;

Fig. 2 is a section along the lines 2—2 shown in enlarged scale for the purpose of better demonstration;

Fig. 3 is an exploded perspective view of the housing;

Fig. 4 is a fragmentary cross section of another embodiment of the watch housing with a rubber tire; and Fig. 5 is an end view of the embodiment shown in Fig. 4 demonstrating its use without rubber tire.

Referring now to the drawing and particularly to Figs. 1 to 3, the watch housing 1 comprises two flat cylindrical bodies 2 and 3, one of which slides over the other, thereby, forming a compartment which receives the works with the dial (not shown). Each of the bodies 2 and 3 has a preferably circular opening 4 and 5 at its base, the latter being set off next to the opening in order to provide a seat 6 and 7, respectively, for the glasses 8 and 9 (shown in dotted lines). The entire base is preferably slightly tapered towards the outer periphery and forms a flange 10 and 11, respectively, extending beyond the cylindrical portions 12 and 13 which are equipped with axially extending open slots 14 and 15, respectively, which slots are adapted for a purpose to be described later.

The two cylindrical bodies 2 and 3 support an outer ring-shaped member 16 which is clamped between the flanges 10 and 11 of the inner housing and is equipped in the embodiment shown in Fig. 2 with an outer groove 17 adapted to receive a tire 18 of rubber or other suitable elastic material the inner cross section of which is substantially supplementary to the cross section of the groove 17. The outer design 19 of the tire 18 may be of any convenient shape. The ring shaped member 16 may be of metal, but preferably of plastic material which lends itself to any desired color. Since the ring member 16 is easily exchanged the same watch housing may be used with a plurality of members 16 each of a different color.

The ring member 16 has at its inside surface preferably two recesses 20 and 20', respectively, which are shown in Fig. 1 spaced apart at 90°, but may be spaced apart at any predetermined angle. One of the recesses 20 and 20' is adapted to receive the crown of the watch (not shown) which is made possible by passing the winding shaft of the watch through the slots 14 and 15 of the bodies 2 and 3, said slots being disposed opposite the recess receiving the crown of the watch. The other recess is adapted to receive a chain or ribbon to which the watch housing is to be attached.

While the embodiment shown in Figs. 1 to 3 requires the tire 18, the second embodiment, disclosed in Figs. 4 and 5, lends itself to be used with or without tire.

The second embodiment comprises the same inner housing consisting of the cylindrical bodies 2' and 3' having openings 4' and 5' and forming seats 6' and 7' for the glasses 8' and 9'. The flanges 10' and 11' clamp the ring shaped member 16', which, however, in this embodiment is tapered towards the periphery to form an edge 21' and thus renders a watch housing. The outer, preferably plastic ring 16' may be exchanged in accordance with the desired color.

Though the ring 16' may be used without a tire (Fig. 4), such tire 18' may be provided by making an inner groove in the tire which is about complementary in its cross section with that of the edged ring member 16'.

It should be also pointed out that the cylindrical bodies 2 and 3 may be manufactured by pressing steps while the plastic ring 16 may be made in a molding process and, thereby, it is possible to manufacture the watch housing in accordance with the present invention in a very economical manner.

While I have disclosed two embodiments of the present invention, it is to be understood that these embodiments are given by example only and not in a limiting sense, the scope of the present invention being determined by the objects and the claim.

I claim:

In a watch housing, two substantially cylindrical hollow bodies each having a base, one of said bodies telescopically disposed in the other and the bases of said bodies being arranged oppositely, at least one of said bases having an opening to receive a glass cover, both said bodies forming a casing to receive a watch work, an axially extending slot disposed on the cylindrical portion of each of said bodies, said slots of both said bodies coinciding in assembled positions, the base of each of said bodies projecting over the cylindrical portions forming two flanges, and an outer ring member clamped between said flanges of the said bodies, said ring member having a recess at its inner margin, adapted to receive and to protect a winding crown of the watch work, and a groove at its outer periphery adapted to receive the complementary portion of a tire disposed around said ring member.

EMERIC DEVAY.

REFERENCES CITED

The following references are of record in the file of this patent:

UNITED STATES PATENTS

| Number | Name | Date |
| --- | --- | --- |
| 837,206 | Ely | Nov. 27, 1906 |
| 2,038,152 | Westerman | Apr. 21, 1936 |
| 2,099,515 | Grey | Nov. 16, 1937 |
| 2,527,090 | Bauman | Oct. 24, 1950 |

FOREIGN PATENTS

| Number | Country | Date |
| --- | --- | --- |
| 146,610 | Switzerland | July 1, 1931 |
| 188,663 | Switzerland | Apr. 1, 1937 |
| 207,887 | Switzerland | Mar. 1, 1940 |
| 269,722 | Great Britain | Apr. 28, 1927 |